May 5, 1959

O. K. KELLEY 2,884,813

PLURAL STEP TRANSMISSION

Filed Jan. 6, 1954

INVENTOR
Oliver K. Kelley
BY
T. L. Chisholm
ATTORNEY

May 5, 1959  O. K. KELLEY  2,884,813
PLURAL STEP TRANSMISSION

Filed Jan. 6, 1954  4 Sheets-Sheet 4

INVENTOR
Oliver K. Kelley
BY
T. L. Chisholm
ATTORNEY

United States Patent Office 2,884,813
Patented May 5, 1959

2,884,813

PLURAL STEP TRANSMISSION

Oliver K. Kelley, Birmingham, Mich., assignor to General Motors Corporation, Detroit, Mich., a corporation of Delaware Application January 6, 1954, Serial No. 402,483

13 Claims. (Cl. 74—754)

This invention relates to improvements in transmissions and more particularly to improvements in multi-planetary unit transmissions.

In the transfer of torque from a prime mover to a final driven member or shaft it may be desirable, when the prime mover has a relatively high speed of rotation to provide a transmission which will reduce the speed of rotation of the prime mover to a lower speed for drive purposes. Consequently, if the prime mover has a high speed of rotation and various permanent reduction gears are used in the gear train, it may be desirable to provide a planetary transmission for supplying at least two reduction ratios, with the transmission interposed between the prime mover and the permanent reduction gearing. It may also be desirable to provide a further planetary unit so associated with the two forward speed planetary units and with the output shaft thereof as to be operable to reverse the direction of rotation of the transmission output shaft, and hence of the gear train.

Furthermore, in a transmission associated with a high speed prime mover, it may be desirable to assure the supply of lubricating oil to the bearings of the prime mover as well as to bearings in the transmission and in the reduction gear train, with this lubrication being supplied even if the prime mover is at rest. In transmissions of this general type it has been customary to provide an engine driven pump for supplying oil for lubrication and also for operating parts of the transmission, particularly while the vehicle supporting the transmission is at rest and also prior to attainment of a transmission output shaft speed sufficiently high to drive a second pump at a rate capable of supplying the volume of fluid required. However, if the prime mover is at rest when the vehicle is stationary, auxiliary, positive means must be utilized for supplying oil both for lubrication and cooling purposes and for operating various parts of the transmission until the transmission driven pump can assume the entire task.

An object of the invention is to provide a transmission as previously described in which two planetary gear units are so associated that two speed ratios of reduction drive can be obtained by proper control of the elements of the units.

Another object of the invention is to provide a plural unit planetary gear transmission in which the driving element of each unit is driven by the same input shaft, while the reaction elements thereof can be so controlled as to provide two speed ratios, each of reduction gearing, whereby the output shaft of the transmission is driven at slower rates than the input shaft.

Another object of the invention is to provide a transmission incorporating two planetary gear units in which the sun gears are formed on the input shaft; the first unit has its reaction element or ring gear normally locked against rotation by a spring applied brake; the planet carrier of the first unit is connected to the reaction member or ring gear of the second unit, and such planet carrier has associated therewith a releasable one-way brake for preventing reverse rotation of the carrier and hence of the second unit ring gear.

A further object of the invention is to provide, in association with a transmission as previously described, a transmission driven pump for supplying oil or other lubricant both to bearings of the prime mover and of the transmission, together with a separately driven, preferably electrically driven, pump which is automatically actuated when the pressure delivered by the transmission pump falls below a predetermined value and which is automatically deenergized when the transmission pump is capable of assuming the entire load.

A still further object of the invention is to provide a simplified governor driven by the transmission and developing fluid pressure in proportion to speed of rotation, which fluid pressure can be utilized for automatically changing the speed ratio in the planetary system and which also can be utilized for relieving a part of the load on the transmission driven oil pump.

In carrying out the foregoing and other objects of the invention use is made of a planetary gear system incorporating two planetary units for forward drive and an additional planetary unit for reverse drive. The elements of the two forward drive planetary units are so controlled as to obtain two reduction ratios of transmission through the system, and in association therewith the rear unit can be operated to obtain one reverse ratio.

Oil for supplying the necessary hydraulic pressure to control the planetary unit can be furnished by two pumps, one of which is driven by the transmission and assumes the entire load after a predetermined transmission speed is attained and the other of which is so energized as to be in operation when the transmission is at rest. In the present invention the power for driving the transmission is obtained from a prime mover which, in the preferred form of the invention, can be a gas turbine so connected to the transmission that when the vehicle is at rest the rotor of the gas turbine is also at rest. Since oil for lubrication and cooling purposes is essential when the vehicle is at rest, with fuel supplied to the gas turbine even in small quantities, the second pump can be driven by an electric motor which will function to supply the necessary oil under pressure until the transmission driven pump is able to assume the entire load. Special pressure switches are associated with the two pumps and with a pressure regulator valve in such fashion that the motor driven pump is deenergized when the transmission driven pump can supply the entire oil requirements.

Other features, objects and advantages of the invention will become apparent by reference to the following detailed description of an embodiment thereof wherein, Figs. 1 and 2 together illustrate the transmission mechanism.

Figure 1:
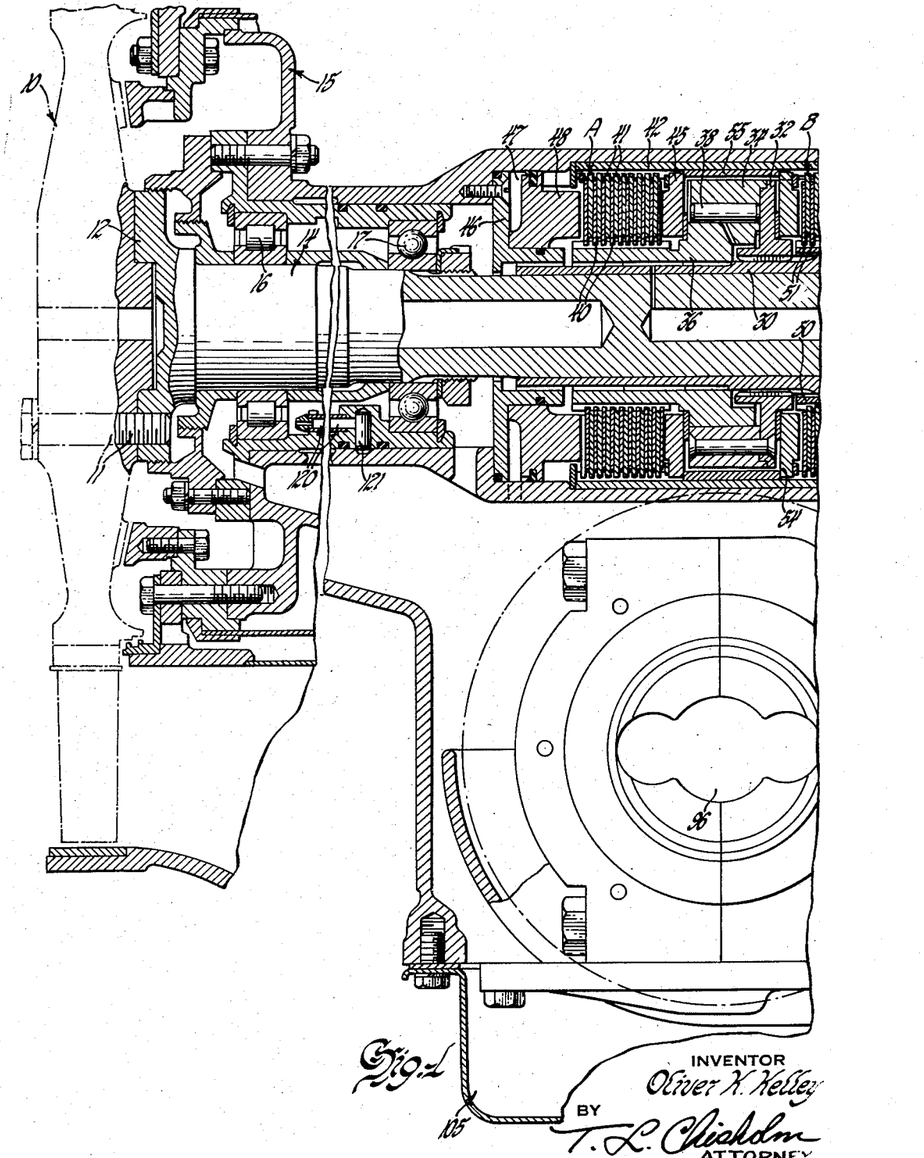
Figure 2:
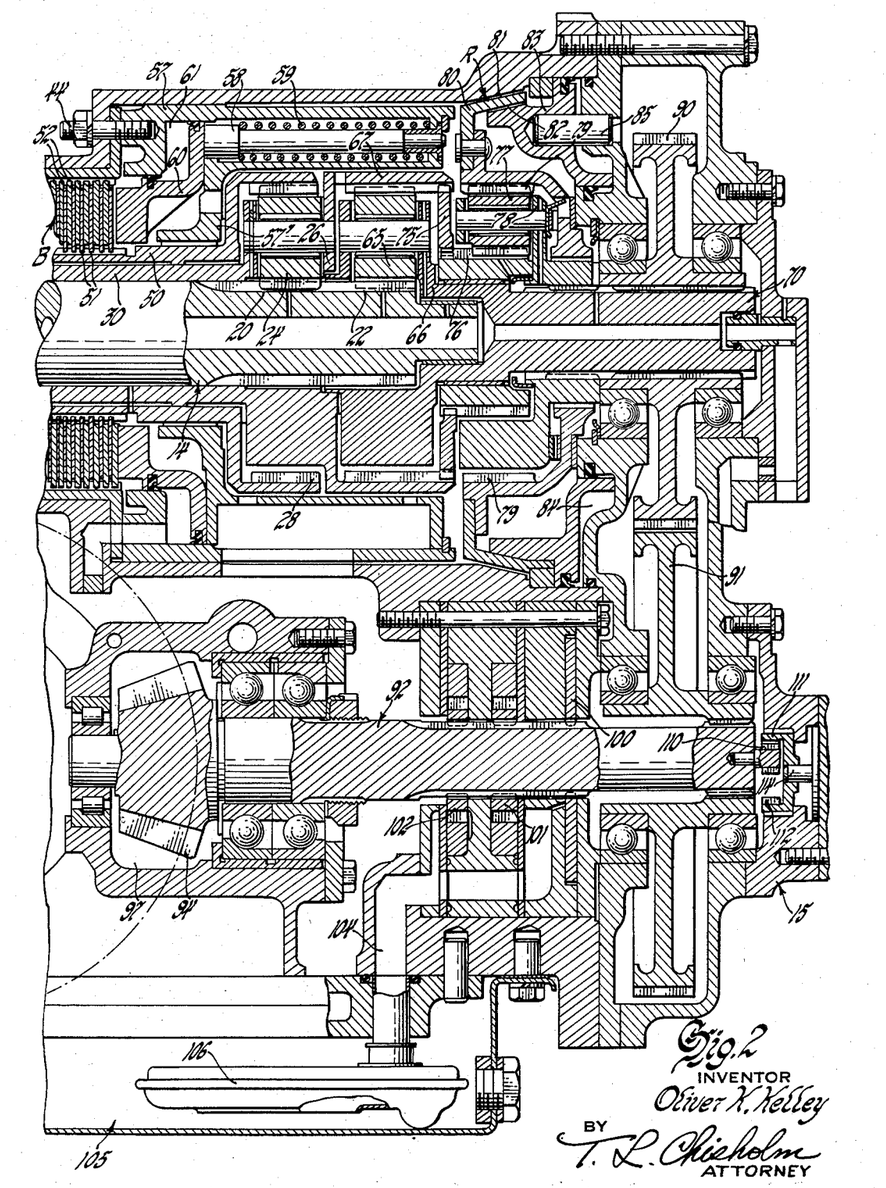

Referring to the drawings and particularly to Figs. 1 and 2, which together illustrate the transmission of this invention, 10 indicates generally a source of motive power; for example, the flywheel of an internal combustion engine or, particularly as illustrated, the rotor of a gas turbine. The hub of the member 10 is secured as by bolts 11 to a flange 12 on the end of transmission input shaft 14. Shaft 14 is supported for rotation in the housing indicated generally at 15, and made up of a number of parts secured together as shown, by means of roller bearing 16 and, further, by ball bearing 17. It will be noted that the main bearing or roller bearing 16 serves not only to support the end of the transmission input shaft but also serves to support the runner or rotor of the gas turbine.

The transmission input shaft 14 has the right-hand end thereof provided with teeth which constitute two sun gear portions 20 and 22. Sun gear part 20 meshes with pinions 24 rotatably mounted in planet carrier 26. These pinions also mesh with ring gear 28. The carrier 26 has an extension in the form of a sleeve shaft 30 surrounding and rotatable about the input shaft 14 and having splined thereto a disk 32 secured to a roller clutch member 34. A cooperating part of this roller clutch member is indicated at 36, with the rollers 38 interposed therebetween. It will be understood that the roller clutch so schematically illustrated is of conventional type or, if desired, may be replaced by a well-known sprag clutch. The member 36 is externally splined to receive splined plates 40 cooperating with plates 41 splined to internal splines of a sleeve 42, a flange of which is secured to a part of casing 15 by bolts 44. A backing plate 45 is also splined to the sleeve 42.

Secured to the casing 15 is an angle member 46 which cooperates with the interior wall of the casing 15 to provide a cylinder 47 in which is slidably mounted a piston 48. Oil admitted under pressure to the cylinder 47 can move the piston 48 to compress plates 40 and 41 together and against the backing plate 45. In this manner the sleeve member 36 can be locked against rotation relative to the casing 15 and thereby forms the stationary member of the one-way roller brake employing the rollers 38.

The ring gear 28 is attached in any suitable manner to a sleeve shaft 50 rotatable about the sleeve 30. This sleeve is provided with splines for the reception of plates 51 cooperating with plates 52, also splined to the sleeve 42 and having associated therewith a backing plate 54, likewise splined to the sleeve 42 and separated from the backing plate 45 by a cylindrical member 55 which may be in the nature of a snap ring. The bolts 44 also are utilized for attaching an annular member 57 to the casing 15, and this member 57 has cooperating therewith a second annular member 57', the two parts being so shaped and dimensioned as to provide a plurality of axially extending slideways for pressure rods 58 which are pressed to the left by springs 59. A piston 60 of the configuration shown in Fig. 2 has the outer end thereof engaged by the rods 58, while the inner portion thereof engages the plates 51 and 52 to force them together and against the backing plate 54, thereby to lock the sleeve shaft 50 to the sleeve 42 and hence casing 15 against rotation relative to the casing. Oil can be admitted to cylinder space 61 to move piston 60 to the right, releasing the brake plates.

The sun gear part 22 is in mesh with pinions 65 mounted for rotation in planet carrier 66, such pinions also being in mesh with ring gear 67 which is physically connected to the carrier 26 for rotation therewith. The carrier 66 is connected to, or formed integrally with, transmission output shaft 70 which has the end of the input shaft 14 piloted therein.

The ring gear 67 of the second planetary unit is connected by means of a disk 75 to sun gear 76 of the reverse planetary unit which also includes pinions 77 meshing with sun gear 76 and mounted for rotation in carrier 78 splined to the transmission output shaft 70. The pinions 77 also mesh with ring gear 79 rotatably mounted about a part of the carrier 78 and having an angular extension 80 of cone formation. This portion is in proximity to a cone formation 81 of casing 15 and can be moved into locking engagement therewith by cone formation 82 of piston 83 which is mounted in a cylinder formation 84 provided by parts attached to the casing 15. The piston 83 is held against rotation relative to the casing by a number of pins 85 and can move axially relative to the casing by introduction of liquid under pressure into the cylinder space indicated at 84. Such liquid forces the piston 83 to the left, causing the cone formation 80 to be gripped between the two cone surfaces 81 and 82, thereby to lock the ring gear 79 against rotation relative to casing 15.

The transmission output shaft 70 has splined or otherwise secured thereto a transfer gear 90 meshing with another gear 91 splined or otherwise secured to the final drive shaft 92. Shaft 92 has secured to the left end thereof a spiral bevel gear 94 which can be in mesh with a similar gear formed either as part of a differential mechanism or rigidly secured to a sleeve for imparting simultaneous drive to the road wheel axles which can be mounted in the space indicated at 96. It will be noted that the gear 94 is positioned in a housing member or box 97 and is supported therein by the usual anti-friction bearings. Similar bearings are also provided at the right end of the final drive shaft 92 for supporting the same for rotation relative to the casing 15.

The shaft 92 is provided with splines to be engaged by similar formations on a governor 100, a main oil pump 101 and a scavenger oil pump 102. The main oil pump 101 is supplied with oil through passage 104 from the sump 105 via strainer 106. A more detailed description of the governor 100 will be set forth later in connection with Figs. 4 to 8. The main oil pump 101 can be of any well-known type but preferably is a gear pump. The scavenger pump 102, also a gear pump, is utilized for drawing oil from the gear box 97 and returning it to the sump so that frothing and energy dissipation will not be occasioned in this gear box. The connections from and to this scavenger pump have not been shown in detail since they are a matter of engineering choice. The same is true of the connections to the main oil pump 101 since the oil circuits associated therewith will be described in detail in connection with Fig. 3. The final drive shaft 92 also has a speedometer gear arrangement connected thereto, such arrangement comprising a pinion 110 staked in the end of shaft 92 and meshing with an internal gear 111 mounted for rotation in a ring bearing 112 in the casing 15. The axis of output shaft 114 of the internal gear 111 is eccentrically mounted relative to the axis of the pinion 110, and this output shaft 114 can be extended through the wall of the casing in a suitable manner, not shown, to drive any type of speedometer or tachometer mechanism, electrical or purely mechanical, which may be desired. It will be obvious that rotation of the shaft 92 and consequently pinion 110 will cause rotation of the internal gear 111 and its shaft 114 at a reduced speed of rotation.

Oil seals, channels for the passage of lubricating oil, etc., have been shown in general, without specific mention made thereof since such details are of engineering choice and can be arranged for most efficient operation. However, one particular lubricating feature deserves special attention and such feature is shown in Fig. 1 by the nozzle 120 supplied with oil from line 121 and directed to spray such oil upon the main roller bearing 16. Since, as before mentioned, the prime mover in the form illustrated constitutes the rotor of a gas turbine and is connected directly to the input shaft 14, it will be obvious that the roller bearing 16 will be subjected to intense heat and will require adequate cooling, preferably through the agency of the lubricating oil. The manner in which this oil is supplied will be described in connection with Fig. 3.

Figure 4:
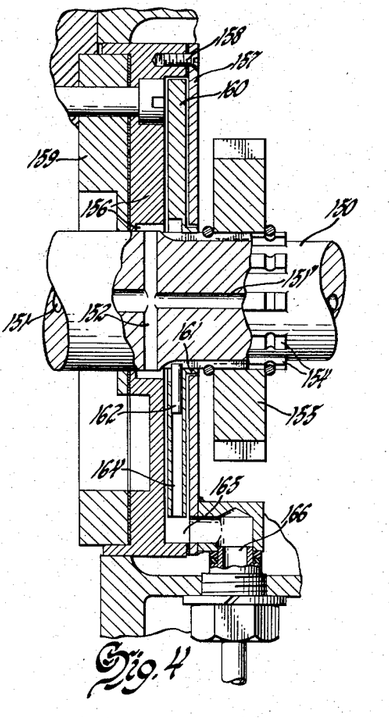
Fig. 4 is a vertical section of a governor employed in this mechanism.
Figure 6:
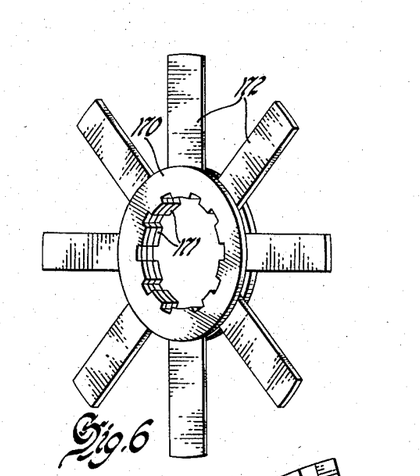
Fig. 6 is a perspective view of a modified of rotating governor element.

The governor 100, shown in Fig. 2 in schematic fashion, has been illustrated in greater detail in Figs. 4 and 6. Fig. 4 represents a form of governor which may be employed in the arrangement of Fig. 2, and the structure shown in Fig. 4 will not correspond exactly with that of Fig. 2. The drive shaft 150 is provided with an axial bore 151 extending to a diametrically extending channel 152 and continued through the bore 151' of reduced diameter. The shaft 150 is provided with splines 154 to receive a driving gear 155. A part of a housing indicated at 156 is cut away to form a disk-like opening, the other side of which is completed by the disk wall 157 secured to the part 156 by screws 158. The two parts 156 and 157 in turn are secured to a stationary frame portion 159.

Figure 5:
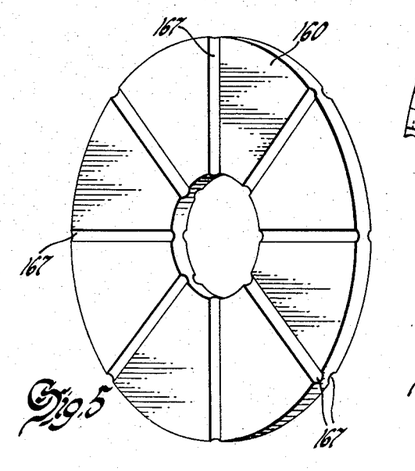
Fig. 5 is a perspective view of a disk which can be employed in the governor.

Surrounding the splined part of shaft 150 and positioned in the space between the walls of member 156 and 157 is a disk 160 which may be of uniform thickness or which may have an axially extending hub part 161. This disk can be secured to the splined part of shaft 150 by a roll pin 162 forced inwardly in a drilled passage 164. A passage 165 communicates with the periphery of the chamber formed by parts 156 and 157 and extends to a fitting or conduit 166 which can be extended to any suitable part of the mechanism where liquid under variable pressure is to be utilized. The disk 160 may be of the form shown in Fig. 5 wherein it will be seen that the flat member is provided with a plurality of radially extending channels 167 on each side thereof.

Oil may be supplied to the chamber in which disk 160 rotates, by way of the bore 151 and the diametric channel 152, by a pump or other source of fluid pressure and such oil will tend to fill this chamber. However, if the shaft 150 is rotated, the disk 160 is likewise rotated, forcing oil in the chamber outwardly to escape therefrom through the passage 165 and conduit 166. Sufficient oil is always supplied both to the disk chamber and to the splines of the shaft 150 to assure that the disk chamber will have oil therein, with any surplus oil permitted to become exhausted from the structure. As the speed of rotation of the disk increases the pressure of the outgoing oil likewise increases, provided it meets resistance. In actual practice it has been found that the pressure developed increases as the square of the speed of rotation of the disk. This device therefore provides a variable pressure, which pressure corresponds over a known curve in accordance with the speed of rotation of the driving shaft, and the pressure so developed can be used in the hydraulic system associated with the transmission for various purposes.

An alternative form of disk has been illustrated in Fig. 6 wherein it will be seen that the hub 170 has internal splines 171 to engage the splines 154, and this hub is further provided with a plurality of radially extending paddle-like members 172. When this type of device is substituted for the disk 160 it will be seen that rotation of the members 172 in the disk chamber will develop a pressure in the exit therefrom in the same manner as the disk 160, and by actual tests it has been found that the developed pressure increases as the square of the speed of rotation.

Figure 7:
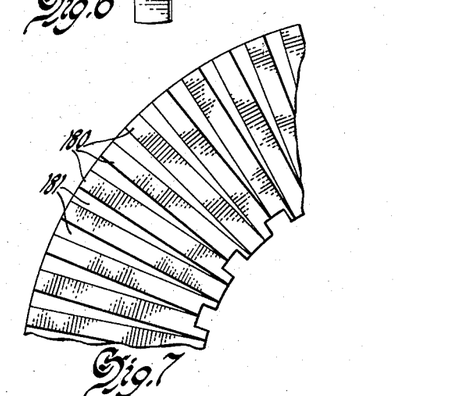
Fig. 7 is a view of a fragment of a further modified form of governor element.
Figure 8:
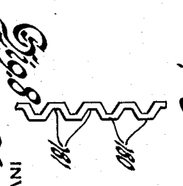
Fig. 8 is an edge view of this modification.

A still further form of spinning member for a governor of this type has been shown in Fig. 7, such device being in the form of a disk provided with a plurality of radially extending corrugations 180 which may be formed in the disk by use of a suitable die. These corrugations may be spaced as desired about the hub or center of the disk with equal spacing or unequal spacing and with all of the channels extending completely from the hub portion being in effect on one side of the disk or may be on alternate sides of the disk. For example, Fig. 8 may represent a view of the outer edge of the disk with the corrugations 180 shown thereon or, if desired, the same may be taken as representing the inner edge of the disk, with the various oil channels indicated at 181 being on opposite sides of the disk.

The planetary gears, previously described, can be operated to obtain two forward speed ratios, resulting from two reduction gear ratios, and reverse rotation of the output shaft 70. The brake A, having plates 40 and 41 therein, is oil applied while the brake B, having plates 51 and 52 therein, is spring applied (by springs 59) and is oil released by oil introduced into the cylinder space 61. As the result of this arrangement, if hydraulic pressure is not being supplied either to the cylinder space 47 or cylinder space 61, brake A is released and brake B is engaged. Release of brake A releases the ground part 36 of the one-way roller brake so that parts 32 and 34 and also sleeve shaft 30 are free to rotate in either direction. Since sleeve 30 is connected directly to the carrier 26, this carrier is also free to rotate in either direction. However, engagement of brake B locks the shaft 50 and consequently ring gear 28 against rotation so that rotation of the turbine rotor, input shaft 14 and sun gear part 20 of shaft 14 will cause the carrier 26 to be rotated in the same direction as the shaft 14 but at a reduced speed due to the reaction afforded by the ring gear 28. This reduced speed of rotation is imparted directly to the ring gear 67 and, since the sun gear part 22 of shaft 14 is rotating at the same speed as the part 20, it follows that the carrier 66 will also be rotated in the same direction as the input shaft at a reduced rate relative thereto, which rate is faster than that of the first carrier 26. Since carrier 66 is connected directly to the output shaft 70, rotation of carrier 66 causes rotation of the output shaft 70 which is communicated through transfer gears 90 and 91 to the final drive shaft 92 and consequently the spiral bevel gear 94. This latter gear drives the wheels of the vehicle in which the transmission is mounted.

The speed ratio just described is the highest speed ratio utilized in this transmission and the same may be employed either for initial and full drive of the vehicle or may be employed only after the vehicle has attained a predetermined speed of travel in a lower speed ratio wherein more torque is developed.

The lower speed ratio can be obtained by applying oil to the cylinder space 47, moving piston 48 to engage brake A, and by applying oil to the cylinder space 61, moving piston 60 thereby releasing brake B. When this occurs the part 36 of the one-way roller brake is locked against rotation so that parts 32 and 34 and sleeve shaft 30 can rotate only in the forward direction. Reverse rotation is prevented by the rollers 38. With this condition established, it follows that release of brake B by application of fluid pressure to the cylinder space 61 will release the ring gear 28, leaving it free to rotate in either direction. Under this condition rotation of the pinions 24 by the sun gear part 20 will not be arrested by the ring gear 28; but the carrier 26, being connected to the ring gear 67, has a reverse force applied thereto. This is due to the fact that rotation of the sun gear part 22 tends to rotate the pinions 65 and, since the carrier 66 is connected to load, rotation of these pinions by the sun gear would normally cause the ring gear 67 to rotate in the reverse direction. This reverse rotation is inhibited by the connection to the carrier 26 and from it to the sleeve shaft 30 and the parts 32, 34 of the one-way roller brake. Therefore, with the ring gear 67 prevented from rotating in the reverse direction, the pinions 65 are compelled to walk around this ring gear, carrying the carrier 66 in the forward direction, which motion is imparted to the output shaft 70. In this fashion, the reduction afforded solely by the second planetary unit is obtained, and this reduction is greater than that obtained in the so-called high ratio previously described. For reverse rotation it is necessary to supply oil under pressure to the cylinder space 84, causing the piston 83 to lock the cone member 80 against rotation, thereby locking the ring gear 79 against rotation. At the same time it is necessary to release the brake A by exhausting any liquid in the space 47 and to release the brake B by applying liquid to the cylinder space 61. With the two forward planetary units conditioned by the release of these two brakes, it follows that rotation of the input shaft 14 in the forward direction rotates both sun gear parts 20 and 22 in the same direction. Since it may be assumed that the vehicle is at rest and a geared connection extends from the road wheels to the carrier 66, rotation of the pinions 65 about their axes will cause rotation of ring gear 67 in the reverse direction. This reverse rotation is communicated to the sun gear 76 of the reverse unit and, since ring gear 79 thereof is held against rotation, the pinions 77 and consequently carrier 78 will be compelled to rotate also in the reverse direction. Since carrier 78 is connected to the output shaft 70, this latter shaft must also rotate in the reverse direction, rotating the carrier 66 therewith. Thus, once reverse rotation of the output shaft has been initiated, the same will continue at a reduced speed, depending on the gear ratios in the reverse gear unit and in the second forward drive unit. Carrier 26 and ring gear 28 of the front unit are free to rotate in either direction as they may be compelled by action of other gear elements.

Figure 3:
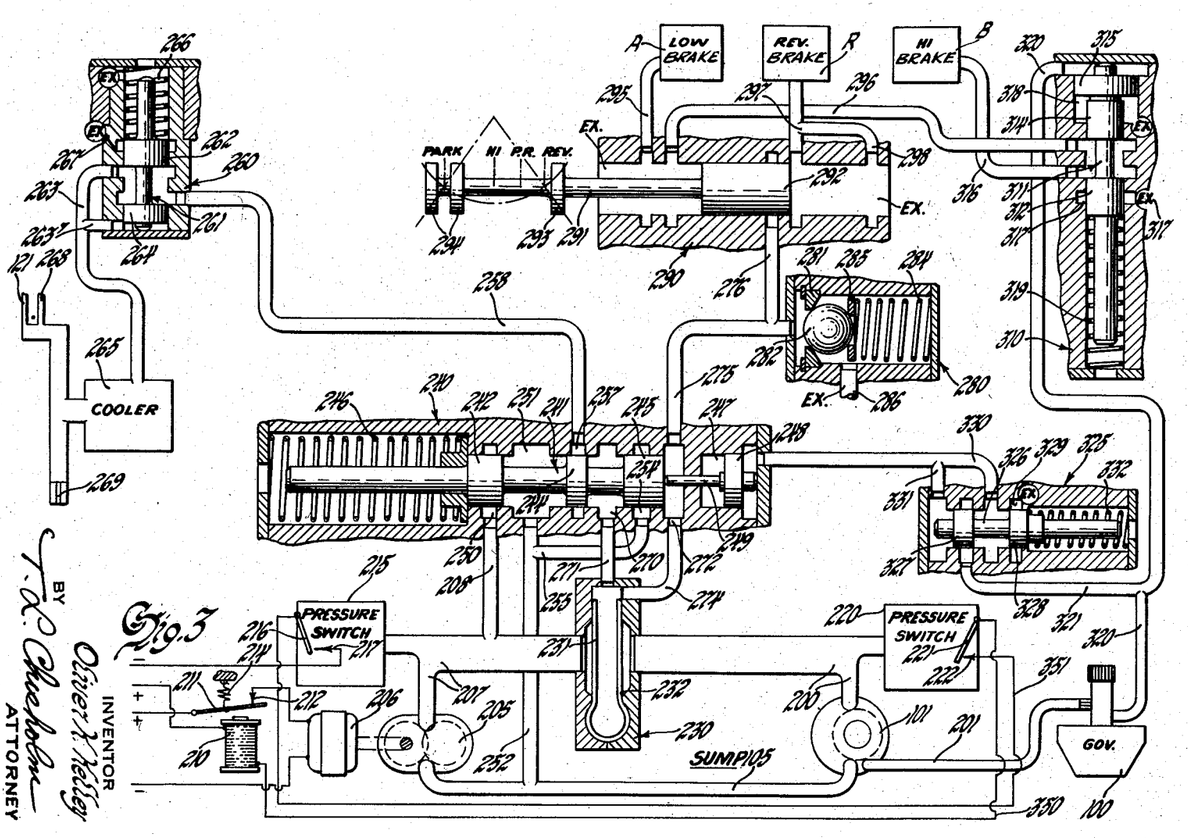
Fig. 3 is a schematic hydraulic circuit diagram for the transmission.

The hydraulic mechanism and circuits for controlling the transmission are shown schematically in Fig. 3. The main pump 101 is shown as pumping oil from the sump 105 (for brevity shown as a line) and delivers this oil to a main supply line 200 as well as to the governor 100 through the line 201. In addition to the pump 101, use is also made of a second pump 205 (not shown in Figs. 1 and 2). The pump 205 may be of gear type and is driven by an electric motor 206. Pump 205 also draws oil from the sump 105 and discharges it through line 207. Energization of motor 206 is controlled by solenoid 210, the armature 211 of which is connected to one side of a source of current and is normally held in contact with terminal member 212 by spring 214. The solenoid 210 is under the control of two pressure switches 215 and 220, the operation of which will be described later.

In association with the two pump discharge lines is a check valve indicated generally at 230 and having therein a hairpin spring type valve member, the opposite legs of which are shown at 231 and 232.

A pressure regulator valve, indicated generally at 240, serves to regulate the effective pressure delivered by the pumps 101 and 205. This valve comprises a body having a bore therein for sliding motion of the valve member 241 which has lands 242, 244 and 245. Spring 246, acting on the valve member 241, biases it to the right. Slidable in a separate bore 247 is a plug member 248 acting on stem 249 which is in contact with the right end of the valve member 241. The main bore has a port 250 connected by line 208 to pump supply line 207. The bore also has a port 251 connected by line 252 to the sump 105. Another port 254 is connected by a branch line 255 to the line 252. Port 257 is connected by line 258 to a lubrication limit valve indicated generally at 260. Port 270 is connected by line 271 to the top of check valve 230. Another part 272 is connected in parallel to line 271 by line 274. This port 272 is also connected by line 275 to the relief valve indicated generally at 280 and by continuation line 276 to the manual valve indicated generally at 290.

The lubrication limit valve indicated generally at 260 comprises a body having a bore therein in which is slidably mounted valve member 261 having lands 262 and 264. A port in the bore of this body is connected to the line 258, while another port is connected by line 263 to the heat exchanger or oil cooler 265. A branch line 263' is connected to a port at the bottom of the bore below land 264. Spring 266, acting on the top of land 262, forces the valve 261 downwardly. A further port 267 is connected to exhaust, by which is meant that oil discharged from this port is returned to the sump 105.

From the cooler 265 branch lines extend, as for example, line 121 to the spray 120 (Fig. 1) for cooling the main roller bearing 16. Another line 268 can extend to a further lubrication supply line in the transmission and the same is true of the restricted line 269.

The safety or relief valve 280 comprises a body having a bore therein in which is located a conical shaped member 281 providing a seat for a ball 282, spring pressed against the seat by spring 284 acting on washer 285. A port in the bore of this member is connected to line 286 which extends to exhaust.

The manual valve indicated generally at 290 comprises a valve body having a bore therein for sliding movement of valve member 291 having a relatively long land 292 and a short land 293 as well as spaced lands 294 for the reception of a fork (not shown) for manually moving the valve. The customary detent mechanism is employed for determining the positions to be selectively assumed by this valve member 291 and such positions have been indicated as "Park" for parking position, "Hi" for high speed ratio, "Pr" for performance or automatic range and "Rev" for reverse.

The bore of this valve body is provided with a port connected to line 295 which extends to the cylinder space 47 of the low brake A. A second port is connected to line 296 which extends to a port in the body of the shift valve indicated generally at 310. A third port is connected to the pump supply line 276, previously mentioned. A further port is connected by line 297 to the cylinder space 84 of the reverse brake R. A fifth port is connected by the branch line 298 to the line 297. Both the right and left ends of the bore of this valve are open to exhaust.

The shift valve indicated generally at 310 has a bore in which is slidably mounted a valve member 311 having lands 312, 314 and 315. The bore of this valve is provided with a port connected to line 316 which extends to the cylinder space 61 of the high brake B. Port 317 and space 318 are connected to exhaust. Spring 319 forces the valve 311 upwardly under predetermined tensile strength. The top of the bore of this valve has a port connected with line 320 which extends to the discharge of the governor 100.

A branch line 321 from line 320 extends to the governor limit valve indicated generally at 325. This valve has a body having a bore therein for sliding movement of valve member 326 having lands 327 and 328. One port 329 of this bore is connected to exhaust. A second port is connected to the line 330 which extends to the pressure regulator valve 240 to introduce oil to the right end of the plug 248 of this regulator valve. A branch line 331 from line 330 extends to a port in the bore of valve 325 to supply oil to the left end of land 327. As before mentioned, another port is connected to the line 321, branched from the governor supply line 320.

The electric motor driven pump 205 is provided in this particular mechanism for the reason above explained, i.e. when the vehicle is at rest the prime mover such as a gas turbine is also at rest so that reliance may not be placed on an engine driven pump for supplying the necessary oil under pressure both for lubrication purposes and for operation of the transmission. The pump 101, driven by the final drive shaft 92, can supply an adequate amount of oil only after a predetermined speed of rotation of this drive shaft is attained. Consequently it is imperative that auxiliary means such as the pump 205 be provided to assure adequate lubrication and to provide oil under pressure to operate the various brakes during starting of the vehicle. However, once the vehicle has attained a predetermined speed, the pump 101 is adequate to supply all of the hydraulic pressure necessary, and provision is therefore made for cutting out the motor driven pump when this condition prevails. The operation accomplishing these desiderata is as follows: Oil supplied by pump 205 through the line 207 develops sufficient pressure to unseat the leg 231 of the hairpin check valve, whereupon this oil continues through line 271 into the bore of the pressure regulator valve 240 between lands 244 and 245. Oil also continues through line 274, to the bore of this regulator valve, to the right of land 245 and continues through line 275 and line 276 to the manual valve 290, at which point it is arrested if the manual valve is in the PARK position shown in Fig. 3, or the HI position. Spring 246 of the pressure regulator valve 240 is calibrated to limit the pressure delivered to line 275 to a predetermined maximum, for example, 140 p.s.i. As soon as pressure is developed in the system beyond the pressure regulator valve in excess of this maximum, this pressure acting on the right end of land 245 moves the valve member 241 to the left, causing land 244 to uncover port 257 connected by line 258 to the lubrication limit valve 260. Oil entering the bore of the regulator valve through line 271 therefore proceeds to the lubrication limit valve 260. Further movement of the valve member 241 to the left causes land 242 to uncover port 250, whereupon oil from the pump 205 can enter the bore of the valve through line 208 and be exhausted therefrom through the line 252 connected to the sump 105. The movement of the valve member 241 to exhaust oil from the pump outlet in the manner just described reduces the pressure which moves member 241 to the left so that spring 246 can move member 241 to the right, closing part 250. In this manner regulation of the pressure delivered by the pump is accomplished and, since valve member 241 travels a shorter distance in opening port 257 than in opening port 250, the regulation is accomplished without interrupting the supply to the lubrication limit valve 260. Oil entering the bore of the valve 260 above land 264 passes therefrom through the line 263 to the cooler 265 and from that cooler to the various lubricating lines. Oil from the branch 263' enters the bottom of the bore to act on land 264 and, when the pressure in this branch line becomes high enough to overcome spring 266, valve member 261 is raised, cutting off the supply line 258 and opening the bore to exhaust at line 267. This mechanism constitutes the well-known limit valve and can be calibrated to assure the desired lubrication pressure of the order of, for example, 40 p.s.i.

Continuing with the operation of the two oil pumps, let it be assumed that the pump 101 is rotated by its drive shaft. This pump immediately supplies oil to the pump line 200 extended to the check valve 230, at which valve the right leg 232 is moved off its seat, permitting the output of pump 101 to merge with the output of pump 205 in the lines 271 and 274. The two pumps, therefore, with both the check valve legs unseated, are supplying oil to the regulator valve 240, with the result that initially only the output from pump 205 is vented to exhaust in the manner previously described. However, as the speed of rotation of pump 101 increases, the pressure delivered thereby likewise increases to such an extent that finally this pressure will be sufficient to move the valve member 241 a further degree to the left, causing the land 245 to uncover port 254 so that additional oil can be exhausted through branch line 255 and the line 252. This additional movement of the valve member 241 to the left causes a further opening of the port 250 so that the major part of the oil being delivered by pump 205 through line 208 can be exhausted back to the sump.

Provision is made for deenergizing the motor 206 and stopping pump 205 when the pump 101 produces sufficient oil pressure for all purposes in this invention. To this end, the two pressure switches 215 and 220 are employed. Pressure switch 215 has a contact member 216 which is normally biased to engage the terminal 217, thereby to condition an electrical circuit for closing. This contact 216 is unseated when the oil pressure in line 207 and supplied to the pressure switch exceeds a predetermined maximum, for example, 50 p.s.i. The pressure switch 220 has a contact 221, normally biased away from the terminal 222 and acted upon by pressure in the line 200 to engage contact 222 when this pressure exceeds a minimum of, for example, 85 p.s.i. An electrical circuit can be traced from positive battery through the winding of solenoid 210, electrical conductor 350 to the contact member 221; from the terminal 222 through electrical conductor 351 to the contact member 216; and from terminal 217 to negative battery. For this circuit to be completed it is necessary for both pressure switches 215 and 220 to be closed, whereupon the solenoid is energized, attracting its armature 211 and breaking the electrical circuit to motor 206.

With the contacts of the two switches biased as just described, it follows that with the pump 205 in operation and the pump 101 assuming the burden as the transmission speed increases, the pressure will rise in the switch 220 to a predetermined value; for example, 85 p.s.i., at which time this switch will be closed. Pump 205, which was delivering oil for lubrication purposes, etc., developed a regulated pressure of 140 p.s.i., which pressure opened switch 215, and the switch remains open until the pressure drops to the critical pressure of 50 p.s.i., before mentioned. Consequently, when the pump 101 is developing sufficient pressure to cause the output of pump 205 to be exhausted, through line 208, the bore of valve 240 and line 252, to such an extent as to decrease the pressure in switch 215 to below 50 p.s.i., the switch will also close, completing the electrical circuit through solenoid 210 and causing it to interrupt the energizing circuit for the motor 206. The rear pump 101 therefore will continue supplying the entire hydraulic needs until its developed pressure drops below that necessary to hold the switch 220 closed, at which time the solenoid energization circuit will be interrupted and the pump motor will be again energized. An operator controlled switch (not shown) may be used to control the battery supply when the vehicle is not in use.

The operation of other valves will become more apparent in the following detailed description of the results of various manual valve positions.

*"Hi" range*

Should the manual valve be moved to the right until mid-point between lands 294 coincides with the "Hi" position, it will be evident that the land 292 will be moved to the right and also the land 293 will be moved into the bore of the manual valve. However, land 292 still interrupts the pump supply line 276 so that oil does not enter the bore of the manual valve and, consequently, the low brake A, previously exhausted through the open end of the manual valve, remains exhausted, and the same is true of the high brake B. The latter brake is spring applied as before described, so that under this condition the ring gear 28 of the first planetary unit is locked against rotation. The reverse brake continues to be connected to exhaust through the branch line 298 and the open right end of the manual valve body.

If the prime mover is now operated, the input shaft 14 will be rotated, causing drive of the two sun gear sections 20 and 22, with the result that the carrier 26 is rotating in the same direction but at a reduced rate of speed, rotating the ring gear 67 so that carrier 66 and output shaft 70 are compelled to rotate in the same direction at a reduction, which is the result of the reduction afforded by this operation of the two planetary gear units. Rotation of output shaft 70 is communicated through the transfer gears 90 and 91 to the final drive shaft 92, and from the gear 94 thereon to the road wheels of the vehicle. Such rotation of this shaft 92 causes actuation of the pump 101 and spins the governor disk, of the type described in detail and indicated schematically at 100. As the car accelerates, the pressure developed by the governor 100 increases until eventually it reaches a pressure supplied through line 320 sufficient to move the shift valve 311 downwardly against spring 319. In the high range this movement of the shift valve has no effect, since oil is not supplied to the brake B when the manual valve is in this position. However, the governor does have another function, i.e. that resulting from its pressure in collaboration with the governor pressure limit valve 325. Spring 332 of this valve normally moves the member 326 to the left against the end of the casing. Oil from branch line 321 can enter the bore of valve 325 and continue therefrom through the line 330 to the plug 248 in the pressure regulator valve structure 240. Oil also enters the left end of the valve bore through branch 331 to act on the land 327 in opposition to spring 332. When the pressure delivered by line 330 and communicated to branch 331 exceeds the strength of the spring 332, the member 326 is moved to the right, cutting off the supply line 321 and connecting the bore of the valve to exhaust at the port 329. In this fashion the output of the limit valve can be metered to the desired pressure in the order of, for example, 50 p.s.i.

This governor pressure delivered to the plug 248 forces it to the left, carrying therewith the rod 249 which acts on the right end of valve member 241. The force exerted by plug 248 in this manner opposes spring 246 so that if the metered governor pressure is in the order of 50 p.s.i., as just mentioned, it will be necessary for the pump 101 to deliver only 90 p.s.i. to the regulator valve to cause this valve to maintain its action of regulating at 140 p.s.i. In this manner the load on the pump 101 is decreased so that the power expended in driving the pump is likewise decreased.

Since the gear ratio resulting from application of the brake B is the highest speed ratio of which this transmission is capable, it will be obvious that the transmission will continue operating in this ratio so long as the manual valve is maintained in Hi range.

*Pr range*

When the manual valve is moved further to the right to the Pr range, the apparatus is conditioned for the best performance or for automatic operation. This range is utilized in instances requiring higher starting torque than can be obtained by conditioning the planetary gearing for high range operation. When the manual valve is so positioned, the land 292 is moved far enough to the right to uncover the port connected to line 276, while the land 293 prevents oil from escaping through the left end of the manual valve body bore. The land 293 is positioned just to the left of the port connected to line 295 so that oil from the supply line 276 can continue through this line 295 to the cylinder space 47, engaging the plates of the low brake A. The ground member 36 of the one-way roller brake is therefore locked against movement so that the sleeve shaft 30 and carrier 26 connected thereto are inhibited against reverse rotation, but are free to rotate in the forward direction, i.e. the same direction of rotation as that of input shaft 14. At the same time oil from the bore of the manual valve body passes through line 296 to the bore of the shift valve 310 and thence through line 316 to the cylinder space 61 of brake B where it acts to move piston 60 to the right (Fig. 2), releasing plates of this brake.

When the input shaft 14 is rotated by the prime mover the two sun gear sections 20 and 22 are rotated, with the end result that reaction being absent from the first gear unit the carrier 26 thereof normally would tend to rotate in the reverse direction, but is prevented therefrom so that ring gear 67, connected to carrier 26, is held against rotation, causing the carrier 66 and output shaft 70 to be rotated in the forward direction at the reduction rate afforded by the ratio of the second planetary unit.

As the vehicle accelerates in this low speed ratio, the pressure developed by governor 100 increases until finally it is sufficient to move the shift valve member 311 downwardly, causing the land 314 to close the port connected to line 296 and causing the land 312 to place the port connected to line 316 in communication with exhaust port 317. When this occurs the cylinder space 61 is exhausted, permitting the springs 59 again to apply the high brake B. When this occurs the ring gear 28 is immediately locked against rotation and supplies reaction, which causes the carrier 26 to be rotated in the forward direction (permitted by the one-way roller brake having rollers 38) and driving the ring gear 67 in the forward direction. Operation in high speed ratio is thus established. This operation will continue until the vehicle speed decreases to such an extent that governor pressure is not sufficient to overcome spring 319 in the shift valve, whereupon that valve will be restored to the position shown, which permits oil to be admitted to the high brake B to release the same, thereby again establishing low speed drive.

The governor limit valve 325 operates as before described to reduce the output of pump 101 so that this pump is required to supply only a pressure lower than that regulated by the valve 240.

*Reverse*

When the manual valve 291 is moved to the reverse position, land 292 is positioned to the right of the port connected to line 297 and is also in position to cover the port connected to line 298. The land 293 is positioned between the ports connected to lines 295 and 296, whereby the low brake A is exhausted at the open left end of the bore while oil is supplied to line 296 and the shift valve 310 and line 316 to release the high brake B. The oil going through line 297 enters the cylinder space 84, moving the reverse piston 83 to the left and causing it to lock the part 80 to the formation 81 of casing 15. Under these conditions the reverse drive through the planetary units, previously described, can take place.

During all phases of operation of this mechanism the safety valve 280 is in standby condition, ready to relieve the pressure in the system should there be malfunction in the regulator valve 240. The spring 284 is so calibrated that the ball 282 will be unseated should the pressure applied thereto exceed a predetermined pressure; for example, 200 p.s.i. When the ball is unseated the oil is permitted to return to the sump from the exhaust line 286.

From the foregoing it will be seen that the present invention provides a transmission employing planetary gear units for forward and reverse drive, with two planetary units so associated that two reduction ratios can be obtained for forward drive. In this manner proper road wheel speed can be obtained with the drive being furnished by a prime mover which has a high speed of rotation.

It will be understood that modifications can be made in the arrangement illustrated without departing from the scope of the invention as defined in the following claims.

What is claimed is:

1. In a transmission of the type described, an input shaft, an output shaft, a source of fluid under pressure, a pair of planetary gear units, each unit having driving, driven and reaction elements, the driving elements of said units being driven by said input shaft, releasable mechanism for holding the reaction element of the first of said units against rotation, the driven element of said first unit being connected to the reaction element of said second unit and the driven element of said second unit being connected to said output shaft, a one-way brake for preventing reverse rotation of the driven element of said first unit whereby when the reaction element of said first unit is released the driven element of the first unit holds the reaction element of the second unit against reverse rotation, valve means for substantially simultaneously directing fluid under pressure to said releasable mechanism for releasing the reaction element of the first unit and to said one-way brake for locking a part thereof against rotation in either direction, and means for releasing said one-way brake whereby the driven element of said first unit and the reaction element of said second unit can rotate in either direction.

2. In a transmission of the type described, an input shaft, an output shaft, a source of fluid under pressure, a pair of planetary gear units, each unit having driving, driven and reaction elements, the driving elements of said units being driven by said input shaft, a normally engaged brake for holding the reaction element of the first of said units against rotation, hydraulically actuated means for releasing said brake, the driven element of said first unit being connected to the reaction element of said second unit and the driven element of said second unit being connected to said output shaft, a releasable one-way brake for preventing reverse rotation of the driven element of said first unit whereby when said normally engaged brake and the reaction element of said first unit are released the driven element of the first unit holds the reaction element of the second unit against reverse rotation to provide one reduction gear ratio through said units between said input and output shafts, valve means for substantially simultaneously directing fluid under pressure to said normally engaged brake for releasing the reaction element of the first unit and to said one-way brake for locking a part thereof against rotation in either direction, and valve means for interrupting the passage of fluid under pressure to said normally engaged brake whereby said normally engaged brake becomes engaged while said one-way brake has a part thereof held against rotation in either direction.

3. In a transmission of the type described, an input shaft, an output shaft, a source of fluid under pressure, a pair of planetary gear units, each unit having driving, driven and reaction elements, the driving elements of said units being driven by said input shaft, a normally engaged brake for holding the reaction element of the first of said units against rotation, hydraulically actuated means for releasing said brake, the driven element of said first unit being connected to the reaction element of said second unit and the driven element of said second unit being connected to said output shaft, a releasable one-way brake for preventing reverse rotation of the driven element of said first unit whereby when said normally engaged brake and the reaction element of said first unit are released the driven element of the first unit holds the reaction element of the second unit against reverse rotation to provide one reduction gear ratio through said units between said input and output shafts, said normally engaged brake when engaged causing said units to provide another reduction gear ratio between said input and output shafts, and valve means having a position for substantially simultaneously directing fluid under pressure to said normally engaged brake for the release thereof and to said one-way brake for locking a part thereof against rotation in either direction, and having another position for directing fluid under pressure solely to said normally engaged brake for the release thereof.

4. In a transmission of the type described, an input shaft, an output shaft, a source of fluid under pressure, a pair of planetary gear units, each unit having driving, driven and reaction elements, the driving elements of said units being driven by said input shaft, hydraulically controlled releasable mechanism for holding the reaction element of the first of said units against rotation, the driven element of said first unit being connected to the reaction element of said second unit and the driven element of said second unit being connected to said output shaft, a hydraulically controlled one-way brake for releasably preventing reverse rotation of the driven element of said first unit whereby when the reaction element of said first unit is released the driven element of the first unit holds the reaction element of the second unit against reverse rotation, said hydraulically controlled mechanism and one-way brake being operable to establish two reduction speed ratios in said gear units, and a manually controlled member for selecting either of said speed ratios for initial drive between said input and output shafts, said manually controlled member in one position directing fluid substantially simultaneously both to said releasable mechanism for releasing the reaction element of the first of said units and to said one-way brake for locking a part thereof against rotation in either direction thereby to establish one of said speed ratios, and having another position arresting the supply of liquid to said mechanism and said one-way brake for establishing the other of said speed ratios.

5. In a transmission of the type described, an input shaft, an output shaft, a source of fluid under pressure, a pair of planetary gear units, each unit having driving, driven and reaction elements, the driving elements of said units being driven by said input shaft, hydraulically controlled releasable mechanism for holding the reaction element of the first of said units against rotation, the driven element of said first unit being connected to the reaction element of said second unit and the driven element of said second unit being connected to said output shaft, a hydraulically controlled one-way brake for releasably preventing reverse rotation of the driven element of said first unit whereby when the reaction element of said first unit is released the driven element of the first unit holds the reaction element of the second unit against reverse rotation, said hydraulically controlled mechanism and one-way brake being operable to establish two reduction speed ratios in said gear units, a manually controlled member for selecting either of said speed ratios for initial drive between said input and output shafts, said manually controlled member in one position directing fluid substantially simultaneously both to said releasable mechanism for releasing the reaction element of the first of said units and to said one-way brake for locking a part thereof against rotation in either direction thereby to establish the lower of said speed ratios, and having another position arresting the supply of liquid to said mechanism and said one-way brake for establishing the higher of said speed ratios, and a shift valve, operable when said manually controlled member selects the lower of said speed ratios for initial drive to automatically shift the control of said units to the higher speed ratio at a predetermined output shaft speed of rotation.

6. A combination with a prime mover of a plural step ratio transmission, hydraulic mechanism for controlling said transmission, a source of liquid under pressure, a pressure regulating valve for limiting the pressure developed by said source, a hydraulic governor driven by said transmission and developing hydraulic pressure in proportion to speed of drive thereof, a passage for hydraulic pressure from said governor to said regulating valve, means incorporated in said pressure regulating valve and subject to hydraulic pressure developed by said governor and delivered through said passage for reducing the pressure delivered by said liquid supply means, and a device in said passage for limiting the hydraulic pressure delivered by said governor to said pressure regulating valve to a maximum pressure lower than maximum governor pressure.

7. A combination with a prime mover of a plural step ratio transmission, hydraulic mechanism for controlling said transmission, a source of liquid under pressure, a pressure regulating valve for limiting the pressure developed by said source, a governor driven by said transmission and developing hydraulic pressure in proportion to speed of drive thereof, a passage for hydraulic pressure from said governor to said regulating valve, and means incorporated in said pressure regulating valve and subject to hydraulic pressure developed by said governor and delivered through said passage for reducing the pressure delivered by said liquid supply means, and a governor pressure limit valve interposed in said passage between said governor and said pressure regulating valve for limiting the pressure delivered by said governor to said pressure regulating valve to a maximum pressure lower than maximum governor pressure.

8. Mechanism of the type described comprising the combination with a prime mover of a transmission driven by said prime mover, hydraulic apparatus for controlling said transmission, a first pump driven by said transmission for supplying liquid under pressure to said mechanism, a second pump for supplying liquid under pressure to said mechanism, said second pump being separately driven independently of said prime mover and said transmission, a pressure regulating valve associated with the outputs of said pumps for regulating the pressures developed thereby, and control devices operable by the pressure developed by said pumps to stop drive of said second pump when the output of said first pump exceeds a predetermined developed pressure.

9. Mechanism of the type described comprising the combination with a prime mover of a transmission driven by said prime mover, hydraulic apparatus for controlling said transmission, a first pump driven by said transmission for supplying liquid under pressure to said mechanism, a second pump for supplying liquid under pressure to said mechanism, said second pump being separately driven independently of said prime mover and said transmission, a pressure regulating valve associated with the outputs of said pumps for regulating the pressures developed thereby, and control devices operable by the pressures developed by said pumps to stop drive of said second pump when the output of said first pump exceeds a predetermined developed pressure, and when the output of said second pump falls below a predetermined pressure.

10. Mechanism of the type described comprising the combination with a prime mover of a transmission driven by said prime mover, hydraulic apparatus for controlling said transmission, a first pump driven by said transmission for supplying liquid under pressure to said mechanism, a second pump for supplying liquid under pressure to said mechanism, said second pump being separately driven, a pressure regulating valve associated with the outputs of said pumps for regulating the pressures developed thereby, and control devices responsive to the pressures developed by said pumps and cooperating to stop drive of said second pump, one of said control devices operating when the output of said first pump exceeds a predetermined developed pressure, and another of said control devices operating when the output of said second pump falls below a predetermined developed pressure.

11. Mechanism of the type described comprising the combination with a prime mover of a transmission driven by said prime mover, hydraulic apparatus for controlling said transmission, a first pump driven by said transmission for supplying liquid under pressure to said mechanism, a second pump for supplying liquid under pressure to said mechanism, said second pump being electrically energized, a pressure regulating valve associated with the outputs of said pumps for regulating the pressures developed thereby, a control device for partially completing an electrical circuit when the output of said first pump exceeds a predetermined developed pressure, and a second control device operative when the pressure developed by said second pump falls below a predetermined minimum to complete said electrical circuit to cause deenergization of said second pump.

12. Mechanism of the type described comprising the combination with a prime mover of a transmission driven by said prime mover, hydraulic apparatus for controlling said transmission, a pump driven by said transmission for supplying liquid under pressure to said mechanism, a second pump for supplying liquid under pressure to said mechanism, an electric motor for driving said second pump, a normally closed circuit energizing said motor, a control circuit for said energizing circuit, a pressure regulating valve associated with the outputs of said pumps for regulating the pressures developed thereby, and separate pressure switches connected respectively to the outputs of said pumps, one of said switches being operable to partially complete said control circuit when the output of said first pump exceeds a predetermined developed pressure, and the other of said switches being operable to complete said control circuit when the output of said second pump falls below a predetermined developed pressure, completion of said control circuit opening said energizing circuit to stop said second pump.

13. Mechanism of the type described comprising the combination with a prime mover of a transmission driven by said prime mover, hydraulic apparatus for controlling said transmission, a pump driven by said transmission for supplying liquid under pressure to said mechanism, a second pump for supplying liquid under pressure to said mechanism, an electric motor for driving said second pump, a normally closed circuit energizing said motor, a control circuit for said energizing circuit, a pressure regulating valve associated with the outputs of said pumps for regulating the pressures developed thereby, and separate pressure switches connected respectively to the outputs of said pumps, one of said switches being operable to partially complete said control circuit when the output of said first pump exceeds a predetermined developed pressure, and the other of said switches being operable to complete said control circuit when the output of said second pump falls below a predetermined developed pressure, completion of said control circuit opening said energizing circuit to stop said second pump, said control circuit being interrupted when the output of said first pump falls below said predetermined developed pressure, interruption of said control circuit automatically restoring said energizing circuit causing drive of said second pump.

References Cited in the file of this patent

UNITED STATES PATENTS

| | | |
|---|---|---|
| 1,619,705 | Chorlton | Mar. 1, 1927 |
| 2,058,245 | McCain | Oct. 20, 1936 |
| 2,105,755 | Patterson | Jan. 18, 1938 |
| 2,193,305 | Thompson | Mar. 12, 1940 |
| 2,195,605 | Thompson | Apr. 2, 1940 |
| 2,221,393 | Carnegie | Nov. 12, 1940 |
| 2,324,713 | McFarland | July 20, 1943 |
| 2,402,248 | Hale | June 18, 1946 |
| 2,459,317 | Granberg | Jan. 18, 1949 |
| 2,526,646 | Ericson | Oct. 24, 1950 |
| 2,629,265 | Dodge | Feb. 24, 1953 |
| 2,640,373 | Jandasek | June 2, 1953 |
| 2,737,824 | Livermore | Mar. 13, 1956 |

FOREIGN PATENTS

| | | |
|---|---|---|
| 351,612 | Great Britain | July 2, 1931 |
| 580,442 | Great Britain | Sept. 9, 1946 |